Jan. 10, 1967  H. G. LASSEN  3,297,336
VERTICALLY SHIFTABLE TRAILER CONSTRUCTION
Filed June 17, 1965  2 Sheets-Sheet 2
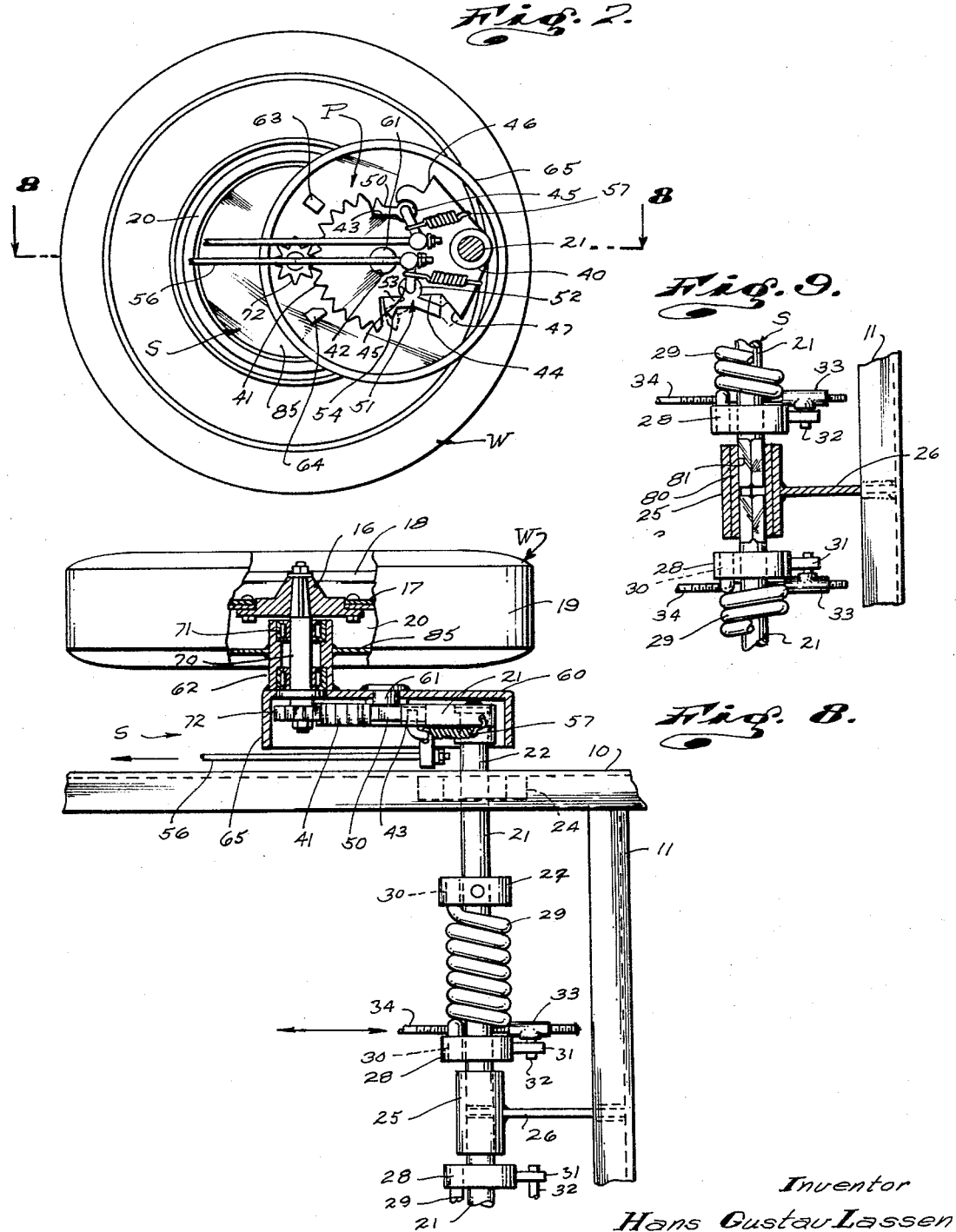
Inventor
Hans Gustav Lassen
By
George C. ...
Attorney

United States Patent Office 3,297,336
Patented Jan. 10, 1967

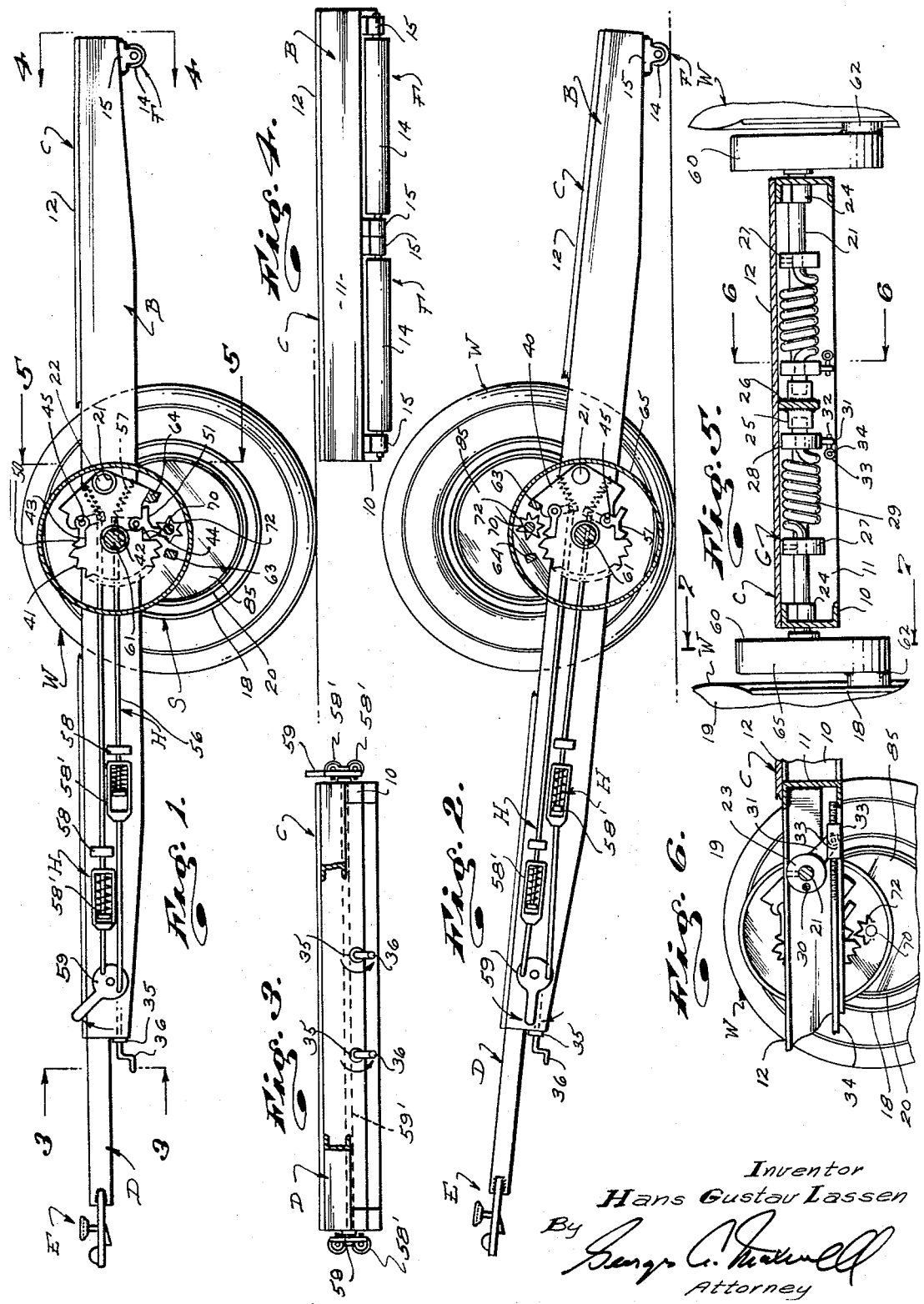

3,297,336
VERTICALLY SHIFTABLE TRAILER CONSTRUCTION
Hans Gustav Lassen, 404 Freeland Ave.,
Long Beach, Calif. 90807
Filed June 17, 1965, Ser. No. 464,718
15 Claims. (Cl. 280—43.21)

This invention has to do with a novel trailer construction and is more particularly concerned with a trailer construction having a vertically shiftable chassis or frame.

Throughout the trailer art, that is, the art of trailable work or cargo carrying vehicles, there is great need for a trailer construction having frame and related bed which can be shifted downwardly from a normal position where adequate running clearance occurs between the frame and a roadbed, to a position where the frame and its related bed are in close proximity to the ground, whereby access to the bed and loading or unloading of the construction is made easier and more convenient.

Further, while many existing trailer constructions are such that it can be tipped longitudinally, so that one end of the frame and bed (usually the rear or trailing end) engages the ground to facilitate loading or unloading the construction, the angle which these constructions assume, when tilted, is considered and is frequently excessive for truly easy and convenient work.

Still further, when it is desired to tip or tilt the ordinary trailer construction, for the purpose of loading or unloading the construction, it must be disconnected from its related draft vehicle and one end thereof elevated, in order to swing the other ends downwardly. Such a requirement is extremely inconvenient and undesirable.

An object of my invention is to provide a construction which is such that the bed can be easily and conveniently lowered from a normal, up or running position to a down or loading position, where the frame and its related bed are in close proximity to the roadbed or ground on which the construction is supported.

It is an object of the present invention to provide a construction of the character referred to which is such that the rear or trailing end of the elongate frame and bed of the trailer can be swung downwardly into engagement with the ground without disconnecting the forward end of the trailer from its related draft vehicle.

Yet another object of this invention is to provide a novel wheel mounting and/or suspension means for trailer wheels having novel gear drive or transmission means between the wheel axle and the frame, which means is such that when said means is engaged and the trailer is moved longitudinally, as by means of the draft vehicle, and so the wheel and its axle rotate, the frame is driven vertically, upwardly or downwardly relative to the axis of the wheel.

It is a further object of my invention to provide novel, manually operable, actuating means for engaging and disengaging the said transmission means.

Still another object is to provide a suspension means of the character referred to having adjustable spring means to allow for yielding vertical movement between the wheels and the frame and in such a manner as to cushion the construction against road shocks and the like.

A further object of this invention is to provide a structure of the character referred to having novel stop means to releasably maintain the construction in its normal position.

It is an object of the present invention to provide a construction of the character referred to which is such that a single person or operator, having no special skill, can easily and conveniently operate the construction without the use of special tools and devices, without the exertion of extraordinary physical force and without the expenditure of excessive time for setting up and the like.

It is an object of my invention to provide a construction of the character referred to which is strong and durable, a construction which involves few parts, and a construction which is both easy and economical to manufacture and maintain.

The foregoing objects and features of my invention, and other objects and features, will be made apparent and will be fully understood from the following detailed description of a typical preferred varying out of my invention, throughout which description reference is made to the accompanying drawings, in which:

FIG. 1 is a side elevational view of my new construction, showing it in its normal position and having portions removed to better illustrate the details of the construction;

FIG. 2 is a view similar to FIG. 1 showing the construction in its down position;

FIG. 3 is an end view taken as indicated by line 3—3 on FIG. 1;

FIG. 4 is an end view taken as indicated by line 4—4 on FIG. 1;

FIG. 5 is a transverse sectional view taken as indicated by line 5—5 on FIG. 1;

FIG. 6 is a sectional view taken as indicated by line 6—6 on FIG. 5;

FIG. 7 is an enlarged detailed sectional view taken as indicated by line 7—7 on FIG. 5;

FIG. 8 is a view taken as indicated by line 8—8 on FIG. 7; and

FIG. 9 is a sectional view of a modified shaft support means.

The trailer construction A provided by the present invention includes an elongate frame B having front and rear ends and upon which a suitable load supporting bed C is suitably mounted. The front end of the frame is provided with a suitable yoke D, which yoke is provided with a suitable hitch mechanism E to facilitate coupling the construction to a draft vehicle (not shown).

The rear end of the frame is shown provided with a ground engaging roller means F to facilitate operation of the construction, as will hereinafter be described.

The construction A further includes a pair of support wheels W, arranged centrally of the frame, at the opposite sides thereof and novel suspension means S between the frame and the wheels.

The frame or chassis B is shown as including a pair of laterally spaced, parallel, longitudinally extending stringers 10 and a plurality of longitudinally spaced tranversely extending spreaders 11 fixed to and extending between the stringers 10. The stringers and spreaders are, in the case illustrated, established of steel channel sections and are secured together as by welding.

It is to be understood that the particular frame construction shown in the drawings and described above is only illustrative of one form of the frame or chassis that can be employed in carrying out my invention and that, in practice, any special or desired type of frame or chassis can be employed in its stead.

The bed C, for the purpose of illustration, is shown as a simple, flat panel 12 of wood or metal fixed to and overlying the top of the frame. In practice, the bed can be fixed to the frame by suitable screw fasteners and serves to reinforce and stiffen the frame or chassis.

The yoke D and its related hitch E, at the forward end of the frame, can be of any desired form and construction without in any way affecting the novelty of the present invention. Accordingly, and since such structures are familiar to all of those who are skilled or familiar with the art, I will not burden this application with further detailed description thereof.

The ground engaging roller means F at the rear end of the frame includes one or more elongate, transversely extending rollers 14 arranged to occur beneath the rear end of the frame and to engage the ground, when the trailer is tilted or tipped, as illustrated in FIG. 2 of the drawings and as will hereinafter be described.

The rollers 14 are, in the form of the invention illustrated, rotatably carried by suitable bearing blocks 15 fixed to and depending from the rearmost spreader 11 of the frame B.

The wheels W are simple, conventional, automotive type wheel assemblies and includes a central axle-receiving hub 16, a disc fixed to and projecting radially outwardly from the hub, a pair of axially spaced annular rims 18 formed with and/or fixed to the disc and a pneumatic tire 19 engaged with and surrounding the rims.

In practice, a brake drum 20 with related braking mechanism (not shown) can be related to the hub and wheel disc, in accordance with common practice.

The wheels W are arranged at the opposite sides of the frame at the central portion thereof, with their axes extending transverse the frame or normal to the longitudinal axis thereof.

Each wheel is suspended on the frame by a suspension means S, for free rotation, for yieldingly or resilient vertical shifting and for controlled vertical shifting relative to the frame.

The suspension means S related to each wheel includes an elongated shaft 21 rotatably carried by the frame on an axis extending transverse the frame and having an outer portion 22 projecting laterally outwardly from the frame and an inner portion 23 arranged within the confines of the frame.

The outer portion of the shaft 21 is rotatably carried by a bearing block fixed to the adjacent stringer 10 of the frame. The inner end of the shaft is rotatably engaged in a bearing block or sleeve 25 suitably mounted in fixed position at the central, longitudinal axis of the frame and in axial alignment with the block 24.

In the case illustrated, the block 25 is secured to one of the spreaders 11 of the frame by suitable mounting plate 26 and serves to rotatably receive and support the inner end of the shaft 21 of both suspension means S, that is, the suspension means related to each of the wheels (as clearly illustrated in FIG. 5 of the drawings).

The means S further includes adjustable spring means G related to the shaft 21 to yieldingly hold the shaft against rotation.

The spring means G is shown as including a first anchor block 27 engaged about and fixed to the inner portion of the shaft, adjacent the stringer 10, a second anchor block 28 rotatably engaged about the inner portion of the shaft, in axial spaced relationship from the first anchor block and in close proximity to the bearing block 25 and a heatable tension spring 29 engaged about the shaft, between the blocks 27 and 28 and having axially extending end portions 30 engaged in suitable openings provided in the blocks.

The block 28 is provided with an elongate, lever arm 31, which arm depends downwardly or downwardly and rearwardly therefrom.

The lower end of the arm 31 is provided with a pin-receiving opening in which a laterally projecting pin 32 on an internally threaded coupler sleeve 33 is pivotally engaged.

The coupler sleeve 33 is threadedly engaged on the rear threaded end portion of an elongate tension rod 34 extending longitudinally of the frame.

The forward end portion of the rod 34 is rotatably engaged in a suitable bearing 35 at the forward end of the frame, against axial shifting, and is provided with a manually engageable crank 36 accessible at the exterior of the frame.

With the above relationship of parts, it will be apparent that by rotating the rod 34 the sleeve is shifted longitudinally of the rod, thereby rotating the arm 31 and block 38 to wind or turn the spring 29 in such a manner as to increase or decrease the tension exerted by the spring onto and through the shaft 21.

In light of the above, it will be apparent and it will hereinafter suffice to say that the shaft 21 is spring loaded and, further, that the load is manually adjustable.

The means S further includes an elongate arm or crank 40 fixed to the outer end of the shaft and projecting longitudinally forwardly or rearwardly therefrom. In the case illustrated, the crank projects forwardly from the shaft and in lateral outwardly spaced, parallel relationship to the adjacent side or rail 10 of the frame A.

The crank 40 is a plate-like forging or casting and is provided at its forward end with a substantially forwardly disposed, substantially vertically extending semi-circular rack 41.

The crank is further provided with a laterally extending bearing opening 42 in its central portion, which opening is concentric with the axis of the rack, a substantially upwardly, radially outwardly opening dog receiving recess 43 adjacent the upper rear end of the rack and a substantially downwardly, radially outwardly opening dog receiving recess 44 adjacent the lower end of the rack.

The recesses 43 and 44 occur circumferentially rearward and radially inward of the related ends of the rack and are of considerable depth and are of considerable circumferential or longitudinal extent.

In addition to the foregoing, the crank is further provided with semicircular, laterally extending bearing seats 45 communicating with the inner rear end portions of the recesses 43 and 44, which bearing seats are adapted to pivotally receive and support suitable dogs, as will hereinafter be described.

The crank is further and finally provided with upper and lower substantially forwardly disposed stop shoulders 46 and 47, which shoulders occur radially outward and circumferentially rearward of the upper and lower ends of the rack 41 and the recesses 43 and 44.

An upper dog 50 is arranged in the upper recess 43 and a lower dog 51 is arranged in the lower recess 44. The dogs 50 and 51 are substantially alike and each includes a cylindrical base 52 rotatably engaged in the bearing seat 45 of its related recess, an elongate shank 53 projecting substantially forward from the base 52 and a radially outwardly projecting tooth 53, similar to the teeth of the rack, at its forward or free end. The dogs are such that they normally occur wholly within the confines of their related recesses (see FIG. 2 of the drawings) and are such that they can be rotated about the axes of their bases so as to shift their teeth radially outwardly into operating alignment with their related end of the racks.

In addition to the foregoing, suitable operating means H are provided for shifting the dogs 50 and 51 into and out of their normal and actuated positions.

The means H are shown as including a substantially radially inwardly projecting lever arm 55 fixed to the inner end of each base 52 to occur adjacent the inner side of the crank, an elongate, longitudinally extending tie rod 56 related to each arm with its rear end pivotally connected with the end of its related arm and its forward end portion terminating adjacent the side of the frame at the forward end portion thereof. In addition to the foregoing, the means H further includes tension springs 57 having one end coupled to the outer end of the arm with which it is related and its other end anchored to the crank at a point spaced rearward of the dog, whereby the dogs are normally yieldingly urged to their unactuated positions.

The forward ends of the pair of rods are engaged through suitable guides 58 on the frame and each has its forward end coupled with a spring loaded coupler 58', which coupler is connected or coupled with a manually engageable operating lever 59 pivotally mounted at the forward end of the frame, ahead of the rod.

The upper rod 56, that is, the rod related to the upper dog, is operatively coupled to the operating lever at a point spaced above the pivotal axis thereof, while the lower rod, related to the lower dog, is operatively coupled to the operating lever at a point spaced below the pivotal axis of the lever.

As a result of the above relationship of parts, it will be apparent that when the operating lever is pivoted or turned in one direction, it shifts one dog to its actuated position and the other dog remains in its normal position. The above operation is made possible by the provision of the spring loaded couplers 58', which couplers yieldingly permit limited lost motion between the rods and the operating lever.

In practice and as illustrated in phantom lines in FIG. 3 of the drawings, the lever arms 59 at the opposite sides of the frame are coupled by a torque shaft 59' so that the dogs can be shifted simultaneously.

The means S further includes a carrier plate or drum P, which plate is arranged adjacent the outer side of the crank 40. The plate 60' is provided with a laterally inwardly projecting trunnion 61, which trunnion projects into the bearing opening 42 in the crank to rotatably support the plate on the crank, on an axis concentric with the rack 41.

In addition to the foregoing, the plate is provided with a laterally outwardly projecting tubular bearing housing 62 spaced radially outward from the trunnion and the rack 41 of the crank.

The plate P is further provided with a pair of inwardly projecting, circumferentially spaced stop lugs, there being an upper stop lug 63 to engage the shoulder 46 on the crank and a lower stop lug 64 to engage the lower stop shoulder 47 on the crank.

The stop lugs serve to limit and stop rotation of the plate relative to the crank, in a normal position where the bearing housing occurs radially outward of the lower recess 44 in the crank (see FIG. 1 of the drawings), and an actuated position where the bearing housing occurs radially outward of the upper recess 43 (see FIG. 2 of the drawings).

It will be apparent that the plate is free to rotate so as to shift the bearing housing circumferentially of the rack, between the said normal and actuated positions.

It is to be noted that the recesses 43 and 44 are rearward of the pivotal axis of the plate so that when the bearing housing on the plate is in one or other of the said normal positions, it occurs rearwardly overcenter of the axis of the plate and is stopped in such overcenter positions by the stop lugs, as clearly illustrated in the drawings.

In practice and as illustrated in the drawings, the lower dog 51 is provided with a normally downwardly and rearwardly inclined latch arm, which arm is adapted to normally engage and stop against a forwardly and upwardly inclined surface on the lower stop lug 64, when the construction is in its normal position and the lug 64 is stopped against the stop shoulder 47. When the lugs 64 moves from an actuated position to its normal position, it yieldingly displaces the latch arm of the dog, whereupon the said arm establishes latched stopping engagement with the lug.

It will be apparent that when the dog 51 is shifted to engage the pinion the latch arm is shifted out of engagement with and clear of the lug.

With the structure set forth above, it will be apparent that the construction is effectively releasably locked against accidental actuation.

In the preferred carrying out of the invention and illustrated in the drawings, the plate is disc-shaped and is provided with a laterally inwardly projecting annular flange 65, which flange surrounds the crank and establishes a drum in which the crank and its related trunnion, dogs, stops and springs are arranged and shielded.

The means S that I provide further includes an axle shaft 70 rotatably engaged in the bearing housing 62 on the plate P by means of suitable bearings 71.

The inner end of the axle projects laterally inwardly from the plate and carries a pinion gear 72, which gear is adapted to occur beneath the recess 44 in the crank, when the construction is in its normal position, to establish driving engagement with the rack 41 when the construction is being shifted to its actuated position, as illustrated in FIG. 7 of the drawings, and to occur above the recess 43 in the crank when the construction reaches and is in its actuated position.

The outer end of the axle projects laterally outwardly from the bearing housing and establishes keyed, driving engagement in or with the hub 16 of the wheel assembly W, as clearly illustrated in the drawings (FIG. 8).

It will be apparent that the drum or plate P occurs laterally inward of the wheel assembly and is of such size and extent that it occurs radially inward of the outer peripheral limits of the wheel assembly at all times.

With the construction set forth above, when the construction is in its normal position, as illustrated in FIG. 1 of the drawings, that is, when the pinion 72 occurs in its overcenter stopped position below the recess 44 in the crank, the lower dog 51 is in its normal position, as illustrated in FIG. 2 of the drawings, the construction can be towed behind a draft vehicle in a normal fashion.

When it is desired to lower the frame and bed of the trailer, the dog 51 by means of the lever 60, is shifted down to engage the pinion 72, as illustrated in FIG. 1 of the drawings.

When the dog 51 is thus engaged and the trailer is rolled back or rearwardly, the pinion 72, which turns with the wheel assembly W, advances or is fed into engagement with the rack 41.

Upon further rearward shifting of the trailer and resulting turning of the wheel assembly and the pinion, the pinion advances forwardly, upwardly and rearwardly about the rack, thereby lowering the horizontal plane of the frame and bed, from a position above the axle as shown in FIG. 1 of the drawings, to a position below the axle, as shown in FIG. 2 of the drawings.

When the construction has reached its fully down or actuated position, the pinion shifts overcenter of the trunnion 61, clear of the rack and the upper dog 50 in the recess 43 of the crank. Further movement is prevented by the stop plug 63.

In the case where the trailer is and remains hitched to its related draft vehicle, the frame and bed are inclined downwardly and rearwardly when the construction is shifted to its actuated position, as illustrated in FIG. 2 of the drawings.

Further, the roller means at the rear end of the frame engages the ground and rollably supports the rear end of the frame. Accordingly, if necessary or desired, the trailer can be advanced or shifted forwardly when so inclined, without damage thereto.

Still further, if desired, the trailer can be unhitched from its related draft vehicle and its forward end lowered to place the bed in a horizontal plane if necessary or desired.

When it is desired to shift the construction back to its normal position, the upper dog 50 is shifted into engagement with the pinion by means of the lever 60 and the structure is rolled or towed forwardly, whereupon the pinion advances forwardly, downwardly and rearwardly about the rack and thence to its normal position.

When the construction is being towed and is rolling across the ground or a roadbed, and the wheels W engage obstructions which tend to elevate the wheels and the frame, the forces are transmitted through the plates and onto the trunnions on the cranks. The trunnions being spaced forward of the spring loaded shafts 21, which pivotally support the cranks, tend to pivot the cranks upwardly and downwardly against the resistance of the spring. Accordingly, the springs serve to effectively buffer the shocks which would otherwise be transmitted directly to the frame and which might otherwise upset the frame and/or damage the work or cargo carried by the said frame.

In practice, the inner ends of the shafts are freely rotatably engaged in the bearing sleeves 25. Accordingly, the wheels are independently suspended.

If desired, and as illustrated in FIG. 9 of the drawings, the inner ends of the shafts 21 can be polygonal in cross section and engaged in the polygonal bore 80 of a coupler sleeve 81, which sleeve is engaged in the bearing sleeve 25. With such a relationship of parts, it will be apparent that the shafts 21 of the two suspension means S are operatively coupled with the wheels W are not independently suspended.

In the case illustrated, a brake backing plate 85 is fixed to each bearing housing 62 to occur within the brake drum 20 of the wheel assembly and on which parts of a conventional braking mechanism, to engage the drum, can be advantageously mounted.

Having described only a typical preferred form and application of my invention, I do not wish to be limited to the specific details herein set forth, but wish to reserve to myself any modifications or variations that may appear to those skilled in the art and which fall within scope of the following claims:

Having described my invention, I claim:

1. A trailer wheel suspension means including, an elongate, horizontal chassis having front and rear ends and parallel sides, a wheel at each side of the frame, an elongate, horizontally disposed shaft related to each wheel carried by and projecting laterally outwardly from the frame at a point spaced rearward of the axis of its related wheel, an elongate crank fixed to and projecting forwardly from the shaft between the frame and the wheel and having a vertically extending forwardly disposed semicircular rack at its forward end and a laterally outwardly projecting trunnion between its ends and concentric with the rack, a carrier plate arranged adjacent the outer side of the crank and pivotally carried by the trunnion, a bearing housing on the plate radially outward from the rack, said plate being pivotally shiftable from a normal position where the bearing housing occurs rearward of the lower end of the rack to an actuated position where said housing occurs rearward of the upper end of the rack, an axle shaft rotatably carried by the bearing housing and having its outer end fixed to the wheel, a pinion on the inner end of the shaft in engaging alignment with the rack, manually operable actuating means carried by the crank to selectively establish driving engagement with the pinion when the construction is in its normal or in its actuated position, whereby the pinion advances into engagement with the rack upon longitudinal shifting of the trailer and rotation of the wheel.

2. A structure of the character referred to in claim 1, wherein said actuating means includes pinion engaging dogs pivotally carried by the crank at each end of the rack to normally occur radially inward of the loci of the rack, link and lever means related to each dog to selectively shift said dog radially outwardly into operating alignment with its related end of the rack and into driving engagement with the pinion.

3. A trailer wheel suspension means including, an elongate, horizontal chassis having front and rear ends and parallel sides, a wheel at each side of the frame, an elongate, horizontally disposed shaft related to each wheel carried by and projecting laterally outwardly from the frame at a point spaced readward of the axis of its related wheel, an elongate crank fixed to and projecting forwardly from the shaft between the frame and the wheel and having a vertically extending, forwardly disposed semicircular rack at its forward end and a laterally outwardly projecting trunnion between its ends and concentric with the rack, a carrier plate arranged adjacent the outer side of the crank and pivotally carried by the trunnion, a bearing housing on the plate radially outward from the rack, said plate being pivotally shiftable from a normal position where the bearing housing occurs rearward of the lower end of the rack to an actuated position where said housing occurs rearward of the upper end of the rack, an axle shaft rotatably carried by the bearing housing and having its outer end fixed to the wheel, a pinion on the inner end of the axle in engaging alignment with the rack, manually operable actuating means including a pinion engaging dog carried by the crank adjacent each end of the rack and selectively shiftable into driving engagement with the pinion when the construction is in its normal or in its actuated position, whereby the pinion is advanced into engagement with the rack upon longitudinal shifting of the trailer and rotation of the wheel, and stop means on and between the plate and crank to limit and stop pivotal movement of the axle relative to the trunnion when the construction is in its normal position or in its actuated position.

4. A structure as set forth in claim 3, wherein said stop means includes, upper and lower stop shoulders on the crank spaced circumferentially rearward and radially outward from the rack and dogs, and upper and lower circumferentially spaced stop lugs on the plate and engageable with said stop shoulders.

5. A structure as set forth in claim 3, wherein said stop means includes, upper and lower stop shoulders on the crank spaced circumferentially rearward and radially outward from the rack and dogs, and upper and lower circumferentially spaced stop lugs on the plate and engageable with said stop shoulders, and a lock arm on the dog related to the lower end of the rack and normally engaged with the side of the lower lug remote from the adjacent stop shoulder.

6. A structure as set forth in claim 3, wherein said stop means includes, upper and lower stop shoulders on the crank spaced circumferentially rearward and radially outward from the rack and dogs and upper and lower circumferentially spaced stop lugs on the plate and engageable with said stop shoulders, said dogs being arranged to normally occur radially inward of the loci of the rack and having link and lever means related thereto to selectively shift the dogs radially outward into operation alignment with their related ends of the rack and into driving engagement with the pinion.

7. A structure as set forth in claim 3, wherein, said stop means includes, upper and lower stop shoulders on the crank spaced circumferentially rearward and radially outward from the rack and dogs and upper and lower circumferentially spaced stop lugs on the plate and engageable with said stop shoulders, said dogs being arranged to normally occur radially inward of the loci of the rack and having link and lever means related thereto to selectively shift the dogs radially outward into operating alignment with their related ends of the rack and into driving engagement with the pinion, and a normally downwardly and rearwardly projecting arm on the dog related to the lower end of the rack to releasably engage the lower stop lug and hold the lug against its related stop shoulder.

8. A structure as set forth in claim 3, wherein said stop means includes, upper and lower stop shoulders on the crank spaced circumferentially rearward and radially outward from the rack and dogs, and upper and lower circumferentially spaced stop lugs on the plate and engageable with said stop shoulders, said dogs carried by the crank at each end of the rack normally occurring radially inward of the loci of the rack and having link and lever means related thereto to selectively shift the dogs radially outward into operating alignment with their related ends of the rack and into driving engagement with the pinion, said link and lever means including a lever arm on each dog at the pivotal axis thereof, and an elongate rod connected with the arm and extending therefrom to an accessible point remote from the suspension means.

9. A structure as set forth in claim 3, wherein said stop means includes upper and lower stop shoulders on the crank spaced circumferentially rearward and radially outward from the ends of the rack and dogs, and upper and lower circumferentially spaced stop lugs on the plate and engageable with said stop shoulders, said dogs being arranged at each end of the rack to normally occur radially inward of the loci of the rack and having link and lever means related thereto to selectively shift the dogs radially outward into operating alignment with the rack and into driving engagement with the pinion, said link and lever means including a lever arm on each dog at the pivotal axis thereof, and an elongate rod connected with the arm and projecting forwardly therefrom, an axially extensible spring coupler at the forward end of each rod, a manually engageable operating lever pivotally carried by the frame on an axis intermediate the rods and extending transverse the axis of said rods, said couplers being connected to the operating lever at diametrically opposite sides of the pivotal axis thereof.

10. A trailer wheel suspension means including, an elongate, horizontal chassis having front and rear ends and parallel sides, a wheel at each side of the frame, an elongate, horizontally disposed shaft related to each wheel, rotatably carried by and projecting laterally outwardly from the frame at a point spaced rearward of the axis of its related wheel, an elongate crank fixed to and projecting substantially horizontally forwardly from the shaft between the frame and the wheel and having a vertically extending, forwardly disposed, semicircular rack at its forward end and a laterally outwardly projecting trunnion between its ends and concentric with the rack, a carrier plate arranged adjacent the outer side of the crank and pivotally carried by the trunnion, a bearing housing on the plate spaced radially outward from the rack, said plate being pivotally shiftable from a normal position where the bearing housing occurs rearward of the lower end of the rack and rearward of the central, vertical axis of the plate to an actuated position where said housing occurs rearward of the upper end of the rack, and rearward of the central, vertical axis of the plate, an axle shaft rotatably carried by the bearing housing and having its outer end fixed to the wheel, a pinion on the inner end of the axle in engaging alignment with the rack, manually operable actuating means carried by the crank to selectively establish driving engagement with the pinion when the construction is in its normal or in its actuated position, whereby the pinion advances into engagement with the rack upon longitudinal shifting of the trailer and rotation of the wheel, and spring means normally yieldingly holding the shaft against rotation.

11. A structure as set forth in claim 10 wherein said actuating means includes an elongate dog pivotally carried by the crank at each end of the rack to normally occur radially inwardly of the loci of the rack, link and lever means related to each dog to selectively shift the dog radially outward into operating alignment with its related end of the rack and into driving engagement with the pinion.

12. A structure as set forth in claim 10 wherein stop means is provided on and between the plate and crank to limit and stop rearward pivotal movement of the axle relative to the trunnion in each of said normal and actuated positions.

13. A structure as set forth in claim 10 wherein stop means is provided on and between the plate and crank to limit and stop rearward pivotal movement of the axle relative to the trunnion in each of said normal and actuated positions, said stop means including a pair of circumferentially spaced stop means including a pair of circumferentially spaced stop shoulders on the crank and a pair of circumferentially spaced stop shoulders projecting laterally inwardly from the plate and engageable with said stop shoulders.

14. A structure as set forth in claim 10 wherein said spring means related to the shaft includes a first anchor block fixed to the shaft, inward of the side of the frame, a second anchor block rotatably carried about the shaft in axial spaced relationship from the first anchor block, a helical torsion spring engaged about the shaft between the blocks and having ends fixed to the blocks, a depending lever arm on said second anchor block, a longitudinally extending sleeve pivotally connected with the lower end of said lever arm, an elongate tension rod threadedly engaged through said sleeve and projecting longitudinally of the frame to one end thereof, bearing means at said one end of the frame rotatably supporting the tension rod and holding said rod against axial shifting and a manually engageable crank on the rod, longitudinally outward of the said bearing to facilitate rotation of the rod and resulting axial shifting of the sleeve and rotation of the said second anchor block to vary the tension of the spring.

15. A structure of the character set forth in claim 14 wherein the shafts related to the wheels at the opposite sides of he frame are in axial alignment and are operatively connected to each other against relative rotation.

References Cited by the Examiner

UNITED STATES PATENTS

| 1,809,500 | 6/1931 | Willig | 280—47 |
| 1,831,899 | 11/1931 | Willig | 280—47 |
| 1,863,780 | 6/1932 | Willig | 280—47 |
| 2,253,419 | 8/1941 | Cunningham | 280—47 |
| 2,684,237 | 7/1954 | Kayler | 280—124 X |
| 3,165,332 | 1/1965 | Barker et al. | 280—124 |

MILTON BUCHLER, *Primary Examiner.*

BENJAMIN HERSH, *Examiner.*

C. C. PARSONS, *Assistant Examiner.*